United States Patent [19]

Galper

[11] Patent Number: 5,049,278
[45] Date of Patent: Sep. 17, 1991

[54] MODULAR PLATE SETTLER

[75] Inventor: Sam Galper, Islington, Canada

[73] Assignee: Samdor Engineering, Islington, Canada

[21] Appl. No.: 416,060

[22] Filed: Oct. 2, 1989

[30] Foreign Application Priority Data

Aug. 30, 1989 [CA] Canada .................................. 609813

[51] Int. Cl.⁵ .......................................... B01D 21/02
[52] U.S. Cl. ................................................... 210/521
[58] Field of Search .............................. 210/521, 522

[56] References Cited

U.S. PATENT DOCUMENTS

| | | | |
|---|---|---|---|
| 3,852,199 | 12/1974 | Wachsmuth et al. ................ | 210/522 |
| 3,886,064 | 5/1975 | Kosonen ............................... | 209/157 |
| 4,039,449 | 8/1977 | Soriente .............................. | 210/206 |
| 4,089,782 | 5/1978 | Huebner ............................... | 210/206 |
| 4,120,796 | 10/1978 | Huebner ............................... | 210/522 |
| 4,156,644 | 5/1979 | Richard ................................ | 210/522 |
| 4,515,698 | 5/1985 | Stewart ................................ | 210/802 |
| 4,889,624 | 12/1989 | Soriente et al. ..................... | 210/522 |

Primary Examiner—Bernard Nozick
Attorney, Agent, or Firm—Bell, Seltzer, Park & Gibson

[57] ABSTRACT

A modular plate settler for use in a liquid clarifier system having one or more inlet ports for receiving an influent flow of liquid, a settling tank for settling and collecting solids separated from the influent flow of liquid and outlet weirs for discharging an effluent flow of clarified liquid. The modular plate settler comprises a parallelogram shaped enclosure provided with a full bottom opening for receiving the influent flow of liquid from the settling tank, and a plurality of inclined parallel gravity settling plates within the enclosure and over which the influent flow of liquid passes toward a full top opening, whereby the solids settle on the plates and slide downwardly under gravitational force into the tank. The flow of liquid is thus clarified of solids and flows through the top opening and effluent trough toward the outlet weirs. Structure and apparatus is provided for supporting the modular plate settler at its center of gravity, such that successive modular plate settlers may be stacked on site end to end within the liquid clarifier system.

8 Claims, 6 Drawing Sheets

MODULAR PLATE SETTLER

FIELD OF THE INVENTION

This invention relates in general to liquid clarifier systems, and more particularly to a modular plate settler for use in a liquid clarifier system within a water purification plant or sewage treatment plant.

BACKGROUND OF THE INVENTION

Gravity plate settlers are well known for use in water filtration facilities for separating flocculated solids from an influent flow of liquid. In accordance with well known prior art systems, a plurality of parallel plates are connected in series over a settling tank. An influent flow of liquid is distributed across the width of the plates and then flows upwardly under laminar flow conditions. The solids settle on the plates while the effluent exits from the plates through flow balancing devices at the top. The clarified liquid then flows via effluent troughs along the tops or side of the plates to an outlet gutter. Meanwhile, the solids slide down the plates due to gravitational forces into the settling tank.

In accordance with the known principles of inclined gravity plate liquid clarification, the effective gravity settling area of each plate is equivalent to the actual area of the plate projected on a horizontal surface. Thus, up to 10 square feet of settling area may result from each square foot of land or floor space occupied by the gravity plate settler.

One prominent manufacturer of prior art gravity plate settlers is the Graver Water Division of Ecodyne.

According to such well known prior art parallel plate settlers, the parallel plates are manually and individually mounted between a pair of channel beams which also function as an effluent trough. Individual mounting of the plates is both time consuming and labour intensive. As a result, a number of modular plate settlers have been developed in an effort to overcome these prior art disadvantages.

For example, U.S. Pat. No. 4,515,698 (Stewart) discloses an inclined plate clarifier module which is suspended in position within a clarifying tank by cables or rods attached to a supporting structure such as a bridge. Fastening rings or eyes are secured in a suitable manner to the module to facilitate lifting and lowering and for securing the module in a desired position within the existing liquid clarifying apparatus.

U.S. Pat. No. 3,852,199 (Wachsmuth et al) teaches the use of abutting separate rectangular modules along slanting end surfaces to permit handling and transportation of a modular multi-tube settling device.

The above referenced prior art systems require careful and time consuming installation with expensive equipment, and are difficult to maintain or service. For instance, the system of Wachsmuth et al extends over the full area of the settling tank thereby preventing access to the underside of the plate settler units for cleaning, maintenance or replacement of sludge collecting equipment within the settling tank.

The system of Stewart suffers from the additional disadvantage of being submerged into the settling tank in a manner that renders the through flow of liquid as parallel to the remaining liquid flowing through the clarifier. In other words, the system of Stewart is not integral with the settling tank.

Furthermore, it has been found that the flow of water through the influent flow distribution orifices in prior art systems can be substantially impeded as a result of turbulence generated by the orifices. This can result in reduced overall efficiency of plant performance and the system.

A number of further prior art approaches have attempted to overcome problems relating to uneven liquid flow through the plate settlers. For example, each of U.S. Pat. Nos. 4,120,796 and 4,089,782 (Huebner) and U.S. Pat. No. 3,886,064 (Kosonen) disclose apparatus for providing equal fluid flow via respective ones of the plate channels. These apparatus are self supporting separate unit structures and are specifically associated with series flows through water purification plants.

In particular, U.S. Pat. No. 4,089,782 (Huebner) teaches multiple inlet manifold chambers containing overflow control devices. The overflow control devices have a primary purpose of evenly distributing liquid to be clarified along the length of the respective input manifold chambers so that liquid to be clarified passes uniformly to the inclined flow passages.

In particular, U.S. Pat. No. 4,120,796 (Huebner) teaches flow regulating channel means employed both at the outside lower and outside upper end of each inclined flow passage. With the clarifier operating in an upflow mode, the flow regulating channel means serve to collect clarified effluent and direct it to a central collection reservoir which is in communication with an effluent conduit. The flow regulating channel means arranged at the upper ends of the inclined flow passages are formed from an elongated plate for defining an enclosed region and having a bent lower edge with a lip extending upwardly from the upper surface of the adjacent inclined clarifier plate.

On the other hand, U.S. Pat. No. 3,886,064 (Kosonen) teaches an adjustable regulating plate arranged in a trough in front of the row outlet openings in each side of a lamellar separator. Spaced apart elongated attachment apertures are arranged vertically in the regulating plates at each end so that the regulating plates can be adjusted to fit the sides of the separator by means of attachment bolts. The regulating plates are usually arranged so that the attachment bolts pass through the upper part of the attachment apertures.

None of the prior art patents teach interchangeability, efficiency and inexpensive means for balancing the flow of liquid to each plate under all flow conditions. Instead, the above prior art systems provide fixed, complex and expensive manufactured features for accomplishing this aim. Moreover, such prior art systems render periodic flushing, cleaning and servicing of the plate settlers both time consuming and labour intensive.

SUMMARY OF THE INVENTION

The present invention comprises a portable and reusable modular plate settler in which a plurality of inclined parallel gravity settling plates or pans are mounted and secured in an enclosure to form a single and complete pre-constructed modular unit. The modular plate settler is provided with means by which the unit may be supported within a liquid clarifier system. The modular unit or multiples thereof can be installed at a site (e.g. water purification plant) and supported via the aforementioned support means on pre-constructed structural supporting beams at the site. The modular construction of the unit results in easy, low cost installation by stacking units end to end, in contrast with the aforementioned prior art systems.

According to a preferred embodiment of the invention, the support means are in the form of a pair of bracket supports mounted on opposite sides of the enclosure and extending the full depth of the enclosure. The support brackets are situated mid-length of the modular unit such that the modular unit rests at its center of gravity on the structural and supporting beams at the site. The length of the brackets allows the modular unit to maintain balance at the required angle of the plates in relation to vertical.

Each modular plate settler of the present invention is completely assembled off-site, requiring no on-site field assembly or adjustment. Successive modules may be stacked on-site end to end on the structural supporting beams, as required.

Furthermore, the modular plate settler of the present invention with its attached effluent trough is adapted to function as an element in series within the liquid clarifier system, and does not require complete coverage of the settling tanks, thereby allowing for access to the underside of the plate settler units for cleaning, maintenance and replacement of sludge collection equipment.

Thus, each modular plate settler of the present invention becomes an integral part of the settling tanks as a result of its functioning as an element in series, in contrast with known prior art modular systems which are submerged into the settling tanks in a manner that renders the through flow as parallel with the remaining flow of fluid within the tanks.

The modular plate settler of the present invention is entirely portable. Thus, in accordance with a further aspect of the present invention, a novel cradling apparatus and lifting system is provided for lifting each modular unit from an existing site, and transporting the individual units into a new liquid clarifier system (e.g. purification plant). The lifting and cradling apparatus may also be used to store each unit prior to installation at the new sites.

Therefore, an important aspect of the present invention is the provision of portable and modular plate settlers which can be moved easily from a first site to another site having different arrangement of units than the first site, without re-working the units and without any loss of effectiveness. In particular, great cost savings may be obtained through use of the modular plate settlers of the present invention since the units need not be scrapped when removed from the first site as a result of not fitting elsewhere.

In accordance with a general aspect of the present invention, there is provided in a liquid clarifier system comprising an inlet for receiving an influent flow of liquid, a tank for collecting solids, an effluent trough, and a weir for discharging an effluent flow of clarified liquid, the improvement comprising one or a plurality of generally parallelogram shaped modular plate settlers stacked end to end and connected by an effluent trough to the outlet weir and disposed over the tank. The one or more modular plate settlers each include means for separating the solids from the liquid and depositing the solids in the tank. Apparatus is also provided for supporting the plate settlers at their respective center of gravity, whereby successive ones of the modular plate settlers may be stacked end to end.

INTRODUCTION TO THE DRAWINGS

A preferred embodiment of the invention will be described in greater detail below with reference to the following drawings, in which.

DETAILED DESCRIPTION OF THE INVENTION

Figure 1:
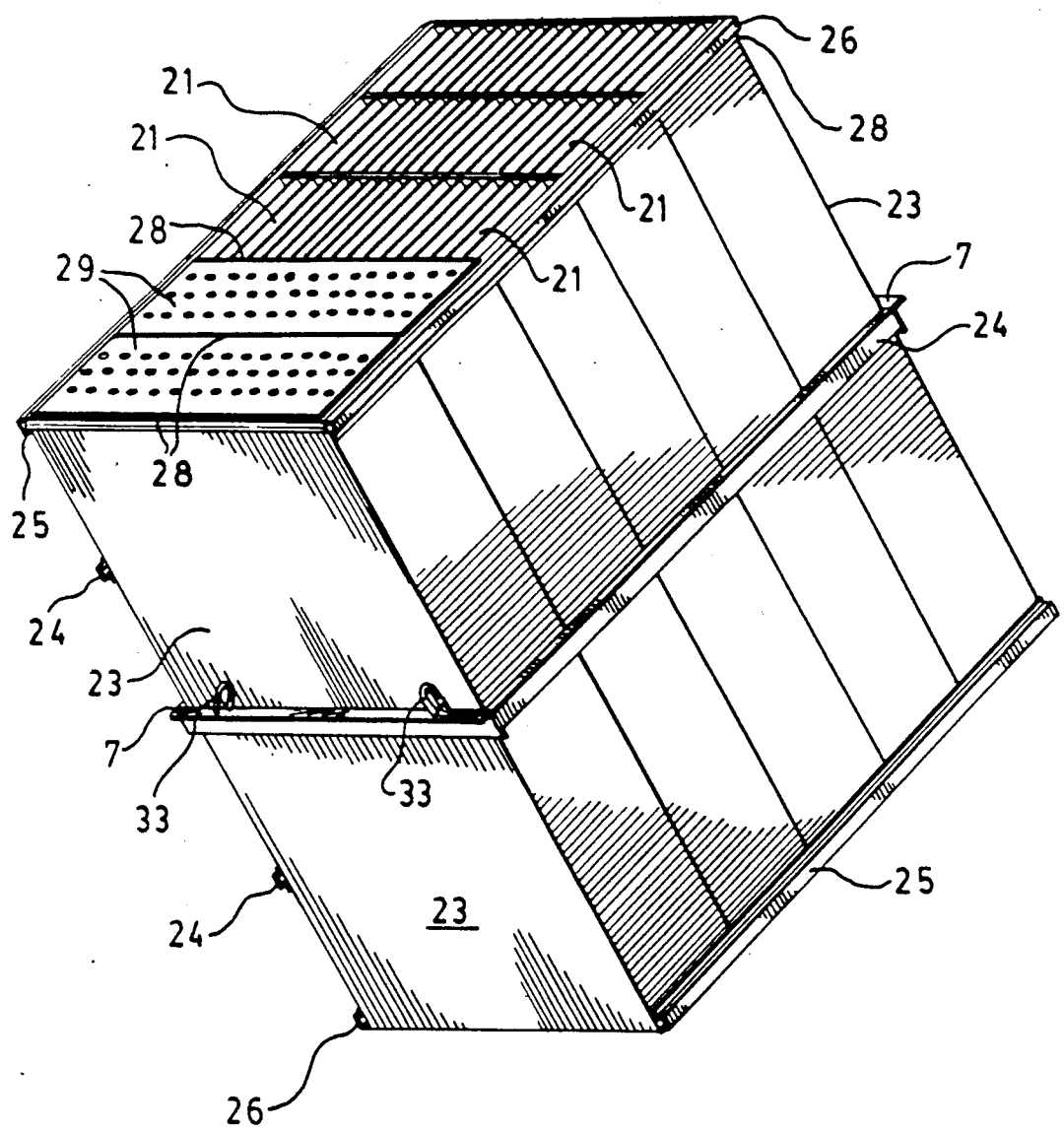
FIG. 1 is a perspective view of the modular plate settler in accordance with the preferred embodiment.

With reference to FIG. 1, a single modular plate settler 5 is shown comprising a plurality of stacking pans 21, end plates 23, support ribs 24, 25 and 26, baffle clips or clip strips 28, perforated plates 29 and bracket supports 7 (one on each side plate 23).

In contrast with most prior art systems, the plate settler of the present invention as shown in FIG. 1 is of unitary construction which allows for ease of handling and installation, as well as easy servicing and maintenance. Although the embodiment of FIG. 1 is shown as having a plate width of five pans, the module can alternatively be comprised of a fewer or a greater number of pans depending on the design requirements of each specific water purification plant.

Figure 2:
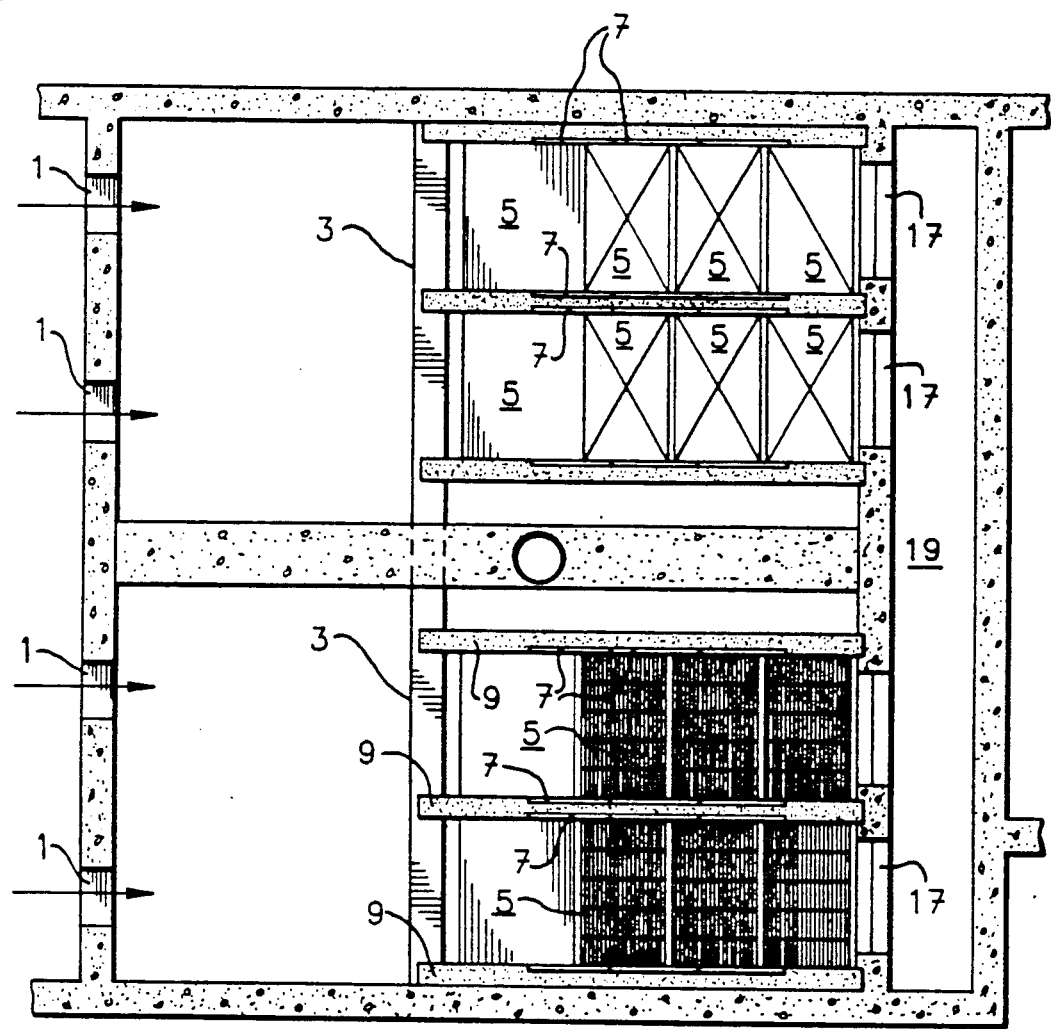
FIG. 2 is a plan view of a liquid clarifier tank incorporating the modular plate settler in accordance with the present invention.
Figure 3:
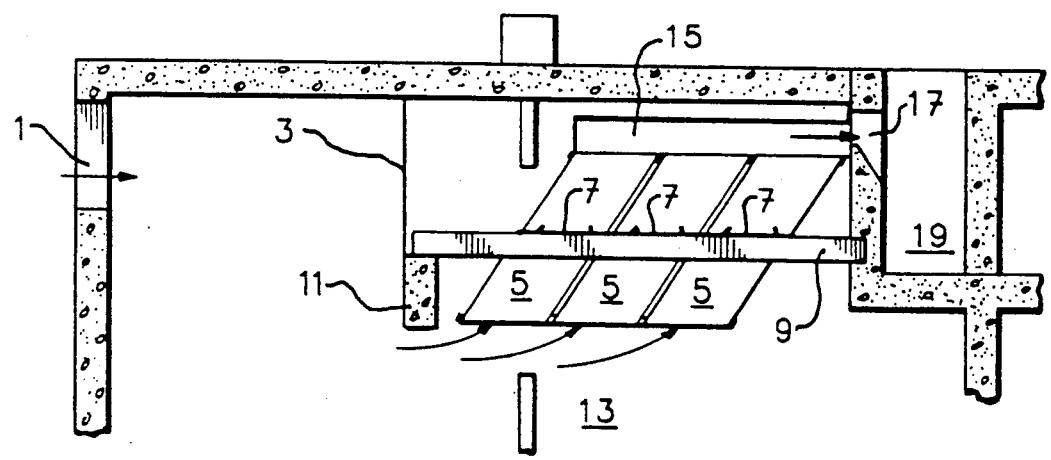
FIG. 3 is an elevation view of the liquid clarifier of FIG. 2.

With reference to FIGS. 2 and 3, a liquid clarifier system is shown comprising a plurality of inlet ports 1 for receiving an influent flow of liquid such as flocculated water to be clarified. The water is directed by means of one or more optional baffle plates 3 towards a plurality of modular plate settlers 5 designed in accordance with the principles of the present invention, as discussed above with reference to FIG. 1.

As shown in FIGS. 1 and 3, each of the modular plate settlers 5 comprises a generally parallelogram shaped enclosure supported via bracket supports 7 disposed centrally thereof on cross beams 9 which are in turn supported via concrete posts 11.

In the embodiment of FIGS. 2 and 3, each plate of the modular plate settlers 5 is five pans wide, as described in greater detail heretofore with reference to FIG. 1. The influent flow of liquid travels upwardly through the plate settlers 5 such that solids settle on internal plates of the units and slide downwardly under gravitational force into a tank or sludge hopper designated generally as 13.

A clarified effluent flow of the liquid exits from the top of the modular plate settlers 5 into an effluent trough 15 toward level control weirs 17.

The effluent trough 15 comprises oppositely disposed sides and end baffle walls 16 for retaining the effluent flow of water which is discharged from the top of each module in the direction of weirs 17. The liquid flows over the weirs 17 into a settled water conduit 19 and therefrom eventually to a point of usage or storage.

Figure 4:
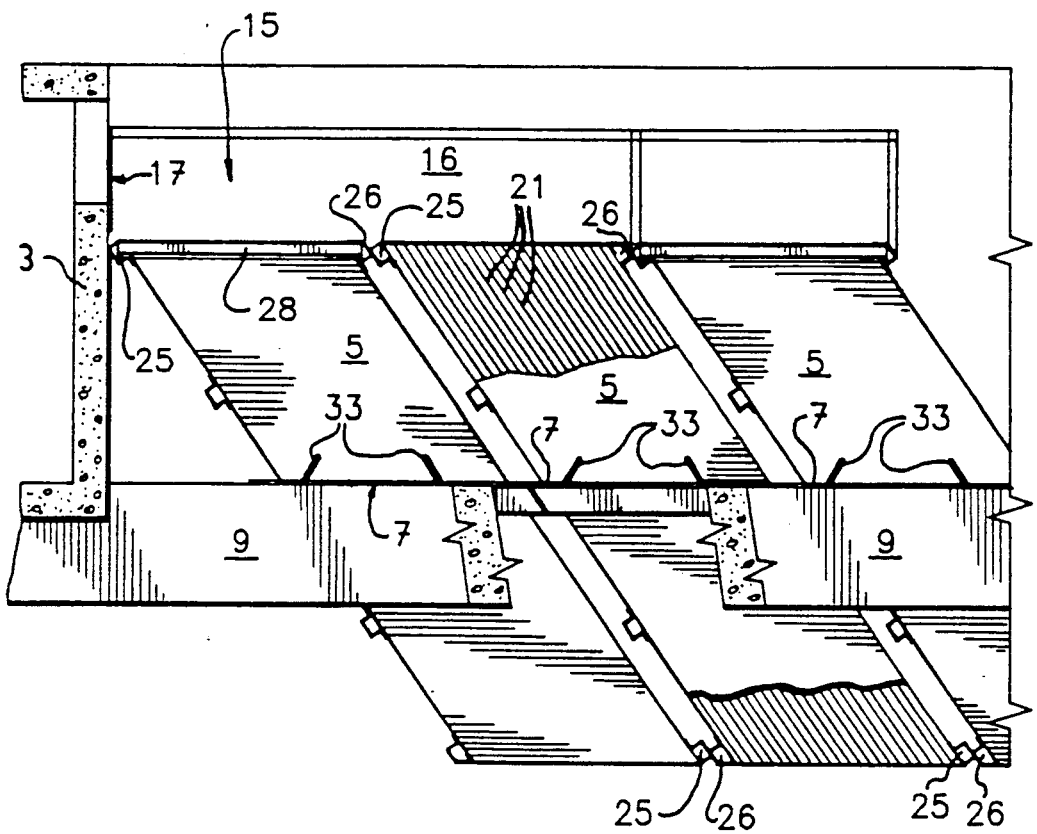
FIG. 4 is a detailed sectional view of the liquid clarifier tank of FIG. 2 showing means for mounting the modular plate settler therewithin.

FIG. 4 is a detailed side view of three modular plate settlers 5 stacked end to end on a horizontal supporting beam 9, for directing water into effluent trough 15 and therefrom over weir 17 into the settled water conduit 19.

The rearmost modular settling plate 5 is shown having a support rib 25 abutting the wall 31 which encloses the settled water conduit 19. Likewise, the plate settlers 5 are stacked end to end having top and rearmost support ribs 25 contacting oppositely disposed top and frontmost support ribs 26 of successive rearwardly adjacent modular plate settlers 5. Each unit or module is supported on the horizontal supporting beam 9 via bracket supports 7, as shown in greater detail with reference to FIG. 5. Thus, the modular plate settlers 5 are designed for stacking end to end, by simply placing the modules in position on the pre-prepared beams 9.

Before and during installation, the modules 5 are transported and placed in position on the beams 9 via novel lifting and cradle apparatus as discussed in greater detail below with reference to FIGS. 8 and 9. After positioning the modular plate settlers 5, the prefabricated effluent trough walls 15 are placed and assembled in a well known manner. The walls 15 extend from outlet weir 17 to a predetermined length depending on the number of modules stacked end to end and terminate with an end baffle wall. No handling of the already positioned modules 5 is required, in contrast with prior art approaches.

The modular plate settlers 5 function as an integral part of the settling tank 13 by forming a series flow through path for the liquid, in contrast with prior art modular units that are submerged into settling tanks in a manner that renders the flow through as parallel.

A pair of lugs 33 are disposed on each bracket support 7 to facilitate lifting, and transporting of the modules 5. In the embodiment of FIG. 1, the lugs 33 are shown as being generally rectangular bars having respective pins therein, whereas in the embodiment of FIGS. 4 and 5, the lugs are shown as being in the form of generally inverted U-shaped bolts. Various alternative lug designs are possible.

Figure 5:
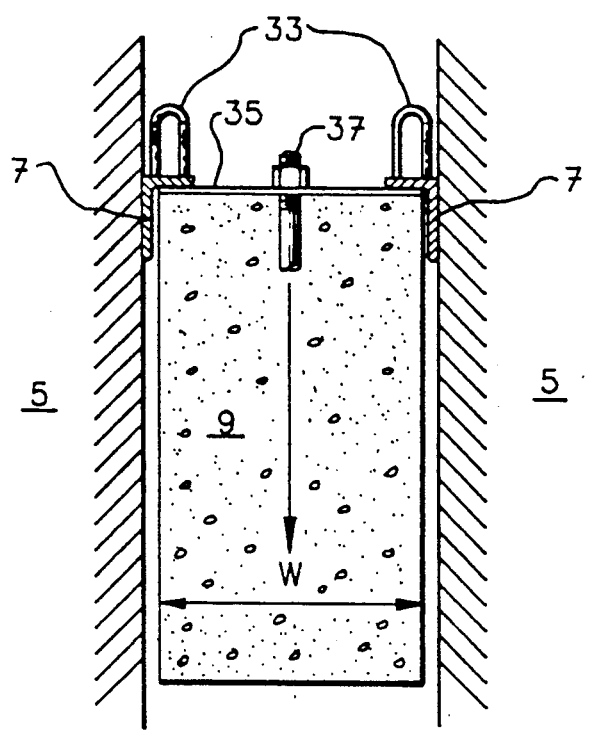
FIG. 5 is a cross section of one of several alternative supporting beams of the liquid clarifier in FIGS. 1, 2 and 4.

As shown in the cross sectional view of FIG. 5, the bracket supports 7 exert downward pressure on a plate 35 which according to one embodiment is bolted into the concrete horizontal supporting beam 9 via a bolt 37.

Figure 6:
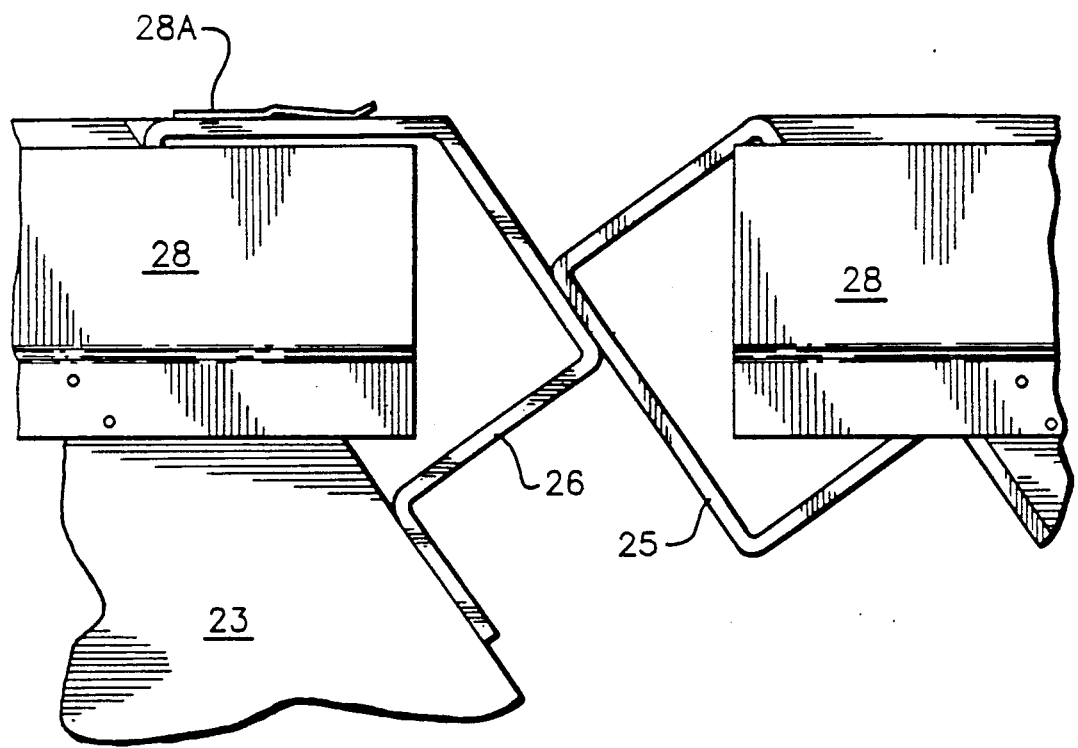
FIG. 6 is a part elevation detail view of the effluent trough baffle wall holding clips forming a separation at the modular plate settlers between the influent and effluent liquids.

Turning now to FIG. 6, relative positioning of the support ribs 25 and 26 of adjacent plate settlers is shown in greater detail. In particular, each support rib 25 and 26 is welded to an adjacent front or rear facing surface of the plate settler 5 and terminates at each clip strip 28. The orientation of oppositely disposed support ribs 25 and 26 provides for a substantially water tight seal at the butting connection therebetween, such that water does not leak therethrough but is forced instead to pass over the plates or pans 21 within the modules. As shown in FIG. 4, a similar disposition of support ribs 25 and 26 is provided for sealing engagement at the bottom of each pair of modules and at mid-height, at the bracket supports.

An end clip 28A is also provided on support rib 26 of the end one of the plate settlers.

Figure 6A:
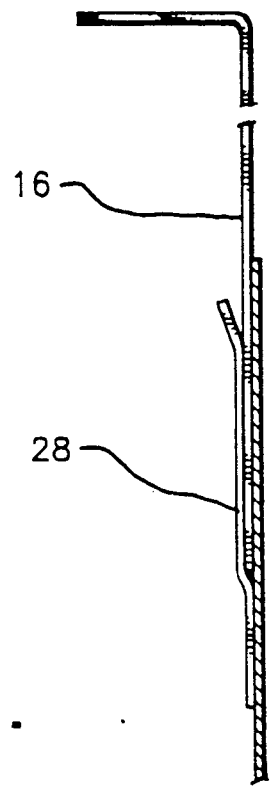
FIG. 6A is a side view of the holding clip of FIG. 6 for retaining a baffle wall forming part of the effluent trough.

FIG. 6A shows a side view of the clip holding or clip strip 28 spot welded at 28B from 20 gauge metal for retaining the associated removable baffle wall 16 of effluent trough 15.

Figure 7A:
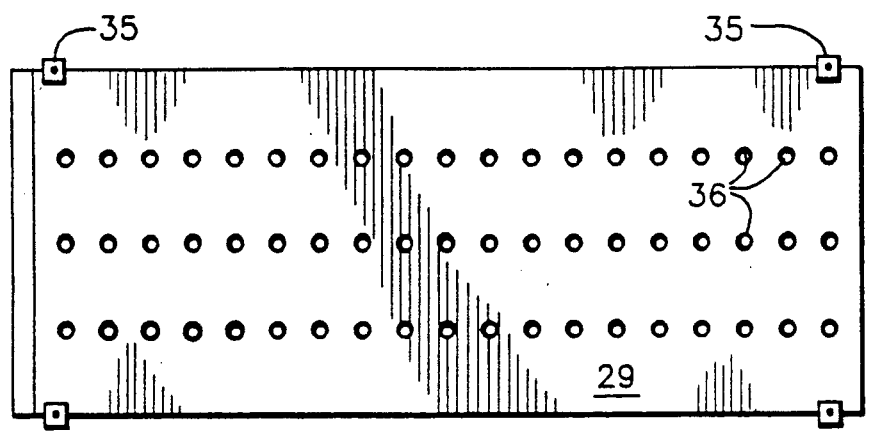
FIGS. 7A and 7B are plan and side views, respectively, of a perforated plate in accordance with the preferred embodiment.
Figure 7B:
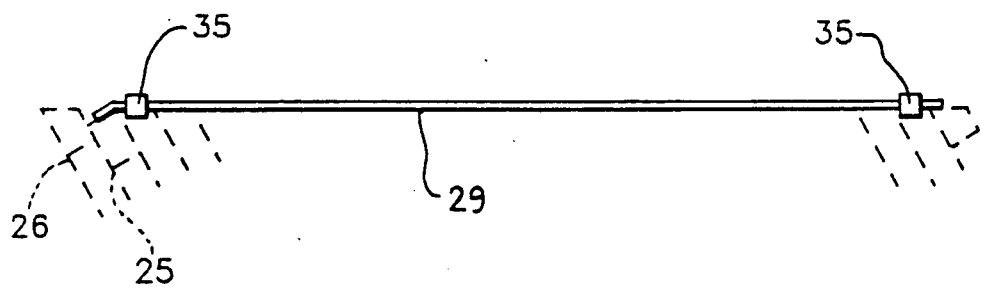

With reference to FIGS. 7A and 7B, a single perforated plate 29 is shown having a plurality of equally spaced apart apertures centered between parallel pans for permitting an equal flow of liquid therethrough. The plate 29 is positioned via spacer clips 35, constrained within the respective stacked pan sections of the module.

Clearances may also be provided between the perforated plate 29 and pan ends to provide additional apertures for flow distribution.

The perforator plates 29 are not secured to the top of the modules as in prior art systems such that the plates are capable under hydraulic pressure of lifting to increase the side aperture area in the event of high flow rates, in order to maintain even and equal liquid flow through the numerous inclined plate sections. The perforated plates 29 are prevented from shifting laterally by means of the spacer clips 35 and are thereby constrained within each pan width. The perforated plates 29 are preferably of predetermined weight so as not to lift during normal designed rates of liquid flow.

The equally spaced perforations or holes 36 in the plate 29 are sized for a preset low hydraulic loss and are spaced evenly over the width of each settling plate pan to assist and induce even flow over the width of the plates or pans 21.

Various modifications to the design of perforated plate 29 are possible within the scope of the present invention, for obtaining various desirable hydraulic losses without requiring complete removal and replacement of the module 5, as is required in prior art systems.

An advantage of the non-secured and free floating design of perforated plates 29 is that the plates may be readily removed for the purpose of flushing the parallel pans 21 during maintenance, as discussed above. The perforated plates 29 are then easily reset in place after such flushing.

Figure 8:
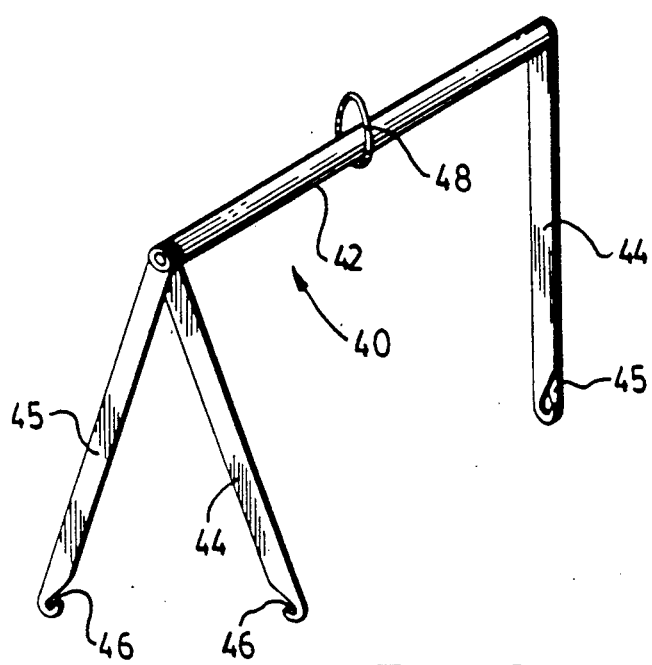
FIG. 8 is a perspective view of a modular plate settler lifting device in accordance with the preferred embodiment.

Turning now to FIG. 8, a lifting device 40 is shown for lifting and positioning the modular plate settlers 5 with respect to the horizontal beams 9.

Specifically, the lifting device preferably comprises a horizontal bar 42 and a pair of lifting arms 44 and 45 pivotally connected at each end of the horizontal bar 42. Respective hook portions 46 are provided at the distal ends of each of the arms 44 and 45 for engagement with the lugs 33 which protrude from the bracket supports 7 on opposite sides of each module, as discussed above with reference to FIGS. 1 and 5.

In operation, the arms 44 and 45 are pivotally swung relative to horizontal member 42 in order to hook on to the lugs 33. The device 40 is then lifted via reinforced hoops 48 by means of a crane or other well known apparatus. The module 5 may then be manually positioned by one or two men and lowered on to the supporting beams 9, as discussed herein above.

Figure 9:
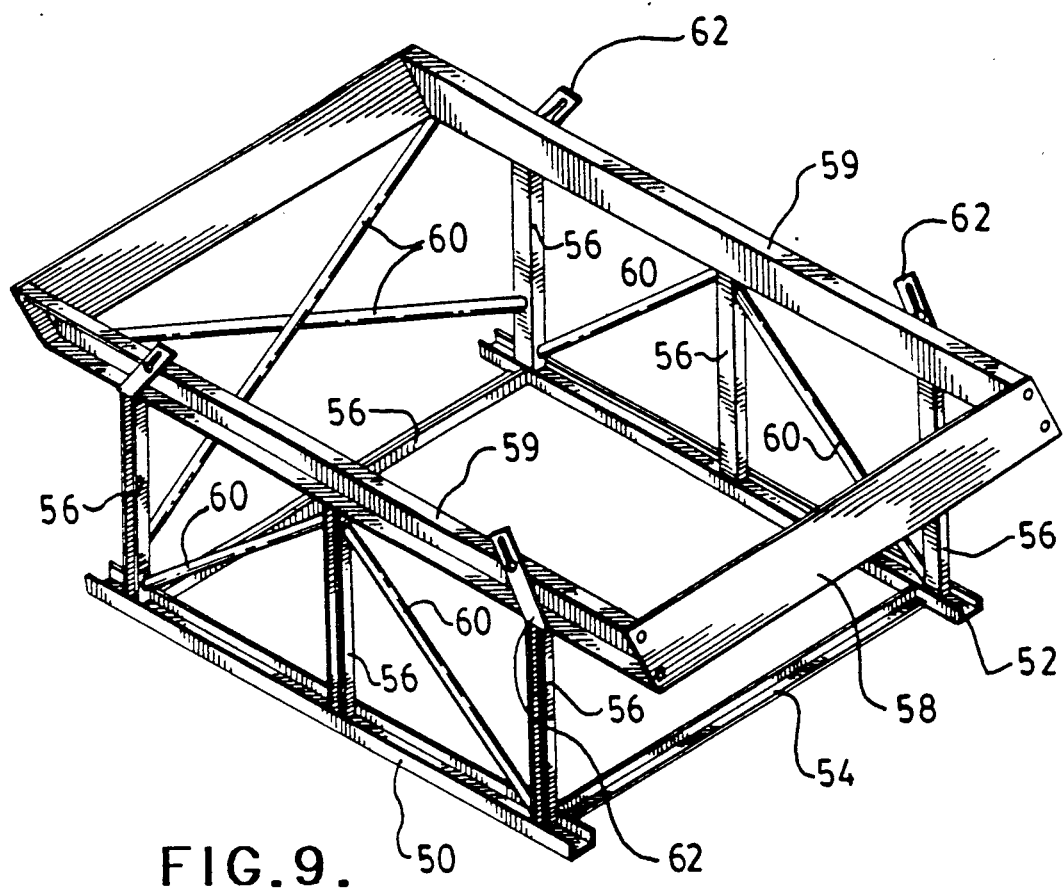
FIG. 9 is a perspective view of a transport cradle for mounting, transporting and storing the modular plate settler of the present invention.

According to a further aspect of the present invention, a transport cradle is also provided, as shown in FIG. 9, for storing or transporting individual or multiple units of the modules 5 to or from a water purification site. The cradle is of generally square construction comprising a first pair of horizontal base support members 50 and 52, a second pair of horizontal support members 54 and 56 extending orthogonally between the members 50 and 52, and a plurality of vertical support members 56 extending upwardly from the horizontal members 50 and 52. A generally parallelogram shaped frame 58 is supported on opposite sides by the respective vertical support members 56, front and rear surfaces of the frame 58 being inclined for accommodating the parallelogram shape of the module 5, and for allowing stacking of cradles end to end on a transporting vehicle. Cross bracing 60 is provided for reinforcing the cradle structure.

Side members 59 of the frame 58 have sufficiently wide top surfaces to carry the bracket supports 7. Lifting lugs 62 are connected to the side members 59, each lug 62 being apertured or slotted to receive a chain link lock by which the cradle may be lifted.

Thus, the transport cradle of the present invention permits convenient storage of the unit when not in use or during transportation of the unit to or from a water purification site.

Figure 10:
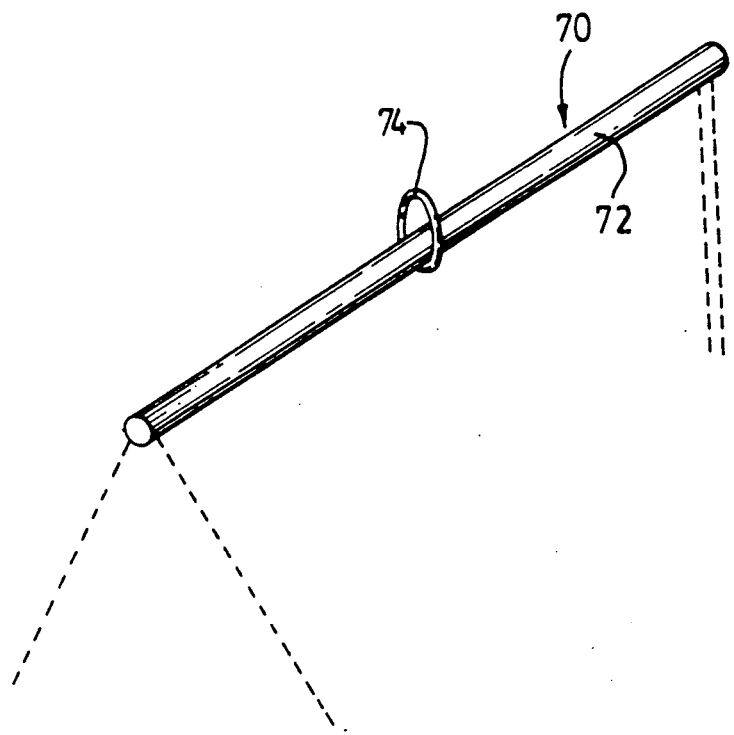
FIG. 10 is a perspective view of a transport cradle lifting device in accordance with the preferred embodiment.

Finally, FIG. 10 shows a lifting device 70 for the transport cradle of FIG. 9. The lifting device comprises a horizontal bar 72 and reinforced hoops 74 for lifting the bar 72 via crane or other well known apparatus. Galvanized steel chain (represented by dashed lines) may be connected at opposite ends of the bar 72 and to the slotted lifting lugs 62.

Thus, the lifting device 70 my be used to move the transport cradle storage in a manner similar to movement of the modular plate settlers 5 via the device 80.

In summary, the modular plate settler of the present invention is designed for ease of handling and transportation, as well as completely modular installation within a liquid clarifier system. The modular plate settler of the present invention allows for future re-use of modules in other plants, without rework of modifications being made to the modules. The modular settlers 5 function as an integral part of the clarifier system by virtue of their series interconnection in contrast with prior art systems which teach parallel flow.

The unsecured perforated plates of the present invention allow for equal and even liquid flow through respective sections of the plate settler as well as easy installation and removal of the plates.

The perforated plates are weighted such that they do not lift during normal flow conditions. Furthermore, by positioning the perforated plates without securing them to the pans, the perforated plates may be readily removed from the trough for the purpose of flushing and cleaning during plant maintenance.

Other modifications and variations are believed to be possible within the spirit of the present invention and the scope of the appended claims.

I claim:

1. In a liquid clarifier system for clarifying an influent flow liquid, comprising a tank for collecting solids, an effluent trough, and weir means for discharging an effluent flow of clarified liquid, the improvement comprising a plurality of modular plate settlers stacked end to end over said tank for receiving said influent flow of liquid, each said plate settlers including an enclosure of generally parallelogram shape as viewed in side elevation, and being connected by said effluent trough for channeling said effluent flow of liquid into said weir means, each said modular plate settlers including means for separating said solids from said liquid and depositing said solids in said tank, said means for separating comprising a plurality of inclined stacking pans in each of said modular plate settlers on which said solids settle due to gravitational force and slide downwardly into said tank, and supporting means for removably supporting said plate settlers at their respective centers of gravity in association with said tank, whereby successive ones of said modular plate settlers may be stacked end to end on said supporting means and may be readily withdrawn from engagement with said supporting means and from association with said tank.

2. The system of claim 1, wherein each of said plate settlers has a full top opening and a full bottom opening, and said inclined stacking pans are parallel to each other, said influent flow liquid passing towards said full top opening of said enclosure and being channeled through said top opening to said weir means.

3. The system claim 1, further comprising flow regulating means for regulating said effluent flow of clarified liquid into said effluent trough to a predetermined maximum flow rate, thereby providing thorough separation of said solids from said liquid equally among respective ones of said plate settlers.

4. The system claim 3, wherein each of said plate settlers has a top opening, and a full bottom opening for receiving said influent flow liquid, and said inclined stacking pans are parallel to each other said influent flow liquid passing towards said full top opening of said enclosure and being channeled through said top opening to said weir means.

5. The system claim 3, wherein said flow regulating means further comprises perforated plate means disposed for easy installation and removal via associated clips in sliding contact with respective ones of said stacking pans, said perforated plate means being provided with a plurality of apertures for channeling said effluent flow into said trough at less than or equal to said predetermined maximum flow rate, said perforated plate means being adapted to lift within said pans in the event said effluent flow is greater than said predetermined maximum flow rate, thereby equalizing rates of flow among respective ones of said plate settlers.

6. The improvement of claim 5 wherein said plurality of apertures are dimensioned to provide a predetermined low level of hydraulic loss and are distributed evenly across said perforated plates for ensuring even flow rates of said effluent flow.

7. The system claim 1, wherein said supporting means comprises a plurality of horizontal beams spanning said tank, and respective pairs of L-shaped bracket supports connected to opposite sides of each said one or a plurality of plate settlers, said pairs of bracket supports extending full depth of said sides at said respective centers of gravity for mounting said plate settlers on said horizontal beams.

8. The system claim 7, further comprising one or a plurality of lugs extending from respective ones of said L-shaped bracket supports, whereby said one or a plurality of plate settlers may be lifted for transportation and installation.

* * * * *